US012112667B2

(12) United States Patent
Kim et al.

(10) Patent No.: US 12,112,667 B2
(45) Date of Patent: Oct. 8, 2024

(54) PIXEL AND DISPLAY APPARATUS CAPABLE OF CONTROLLING TEST FUNCTION PRELIMINARY CLASS

(71) Applicant: Sapien Semiconductors Inc., Seoul (KR)

(72) Inventors: Ji Han Kim, Seoul (KR); Sung Ho Hwang, Seoul (KR); Ji Haeng Lee, Seoul (KR); Dae Young Jung, Seoul (KR)

(73) Assignee: SAPIEN Semiconductors Inc., Gyeonggi-do (KR)

( * ) Notice: Subject to any disclaimer, the term of this patent is extended or adjusted under 35 U.S.C. 154(b) by 0 days.

(21) Appl. No.: 18/366,257

(22) Filed: Aug. 7, 2023

(65) Prior Publication Data

US 2024/0054928 A1 Feb. 15, 2024

(30) Foreign Application Priority Data

Aug. 12, 2022 (KR) ........................ 10-2022-0101250

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0819* (2013.01); *G09G 2300/0842* (2013.01)

(58) Field of Classification Search
CPC ............... G09G 3/006; G09G 2330/12; G09G 2300/0819; G09G 2310/08; G09G 2300/0842; G09G 3/3233; G09G 3/2085
See application file for complete search history.

(56) References Cited

U.S. PATENT DOCUMENTS

2012/0182518 A1* 7/2012 Ho ....................... G09G 3/3233 445/61
2018/0174527 A1* 6/2018 Botzas ................. G09G 3/2003
2022/0101781 A1* 3/2022 Baumheinrich ......... G09G 3/32

FOREIGN PATENT DOCUMENTS

KR 10-2012-0130355 A 12/2012
KR 10-2017-0072407 A 6/2017
KR 10-2020-0077665 A 7/2020

OTHER PUBLICATIONS

Office Action issued Jan. 8, 2024 in Korean Application No. 10-2022-0101250.
Office Action issued Oct. 4, 2023 in Korean Application No. 10-2022-0101250.

* cited by examiner

*Primary Examiner* — Muhammad N Edun
(74) *Attorney, Agent, or Firm* — You & IP, LLC

(57) ABSTRACT

A pixel driving circuit includes a memory unit storing data based on a first signal and a second signal, a driver connected to a luminous element and supplying electric power to the luminous element based on the data stored in the memory unit, and a test controller controlling entry into a test mode in which it is tested whether the pixel driving circuit is defective, wherein the test controller generates a test mode activation signal based on the first signal and the second signal.

11 Claims, 13 Drawing Sheets

PIXEL AND DISPLAY APPARATUS CAPABLE OF CONTROLLING TEST FUNCTION PRELIMINARY CLASS

CROSS-REFERENCE TO RELATED APPLICATION

This application is based on and claims priority under 35 U.S.C. § 119 to Korean Patent Application No. 10-2022-0101250, filed on Aug. 12, 2022, in the Korean Intellectual Property Office, the disclosure of which is incorporated by reference herein in its entirety.

BACKGROUND

1. Field

The present disclosure relates to a pixel included in a display apparatus, and more particularly, to a pixel and a display apparatus which are capable of controlling a test function.

2. Description of the Related Art

A display apparatus generally includes a plurality of pixels, e.g., M×N pixels. Each of the pixels may include one or more luminous elements and generally includes three luminous elements (R, G, and B). Each of the luminous elements is referred to as a sub-pixel.

From among various methods of controlling driving of sub-pixels, a pulse width modulation (PWM) control method stores video data for controlling light emission from a sub-frame during a single frame period in an internal memory and controls a gradation via a PWM signals. For PWM control, a pixel driving circuit for driving each pixel may be implemented as a transistor, but may be divided as a digital circuit and an analog circuit according to an operating region of the transistor.

On the other hand, excellent display characteristics are required for various advanced technologies in a display industry, and in particular, there is an increasing demand for miniaturizing pixel size for high-resolution implementation. Minimizing the pixel size denotes that the pixel driving circuit has to be also reduced, and a corresponding fine process is performed. Accordingly, a function of inspecting whether there is a defect in a pixel driving circuit or a luminous element manufactured through fine processes may be necessary.

The above-mentioned background art is technical information that the inventor has possessed for the derivation of the present disclosure or acquired in the process of derivation of the present disclosure, and cannot necessarily be said to be a known technique disclosed to the general public prior to the filing of the present disclosure.

SUMMARY

Provided are pixels and display apparatuses which are capable of controlling a test function. It will be appreciated by one of ordinary skill in the art that the objectives and effects that could be achieved with the present disclosure are not limited to what has been particularly described above and other objectives and advantages of the present disclosure will be more clearly understood from the following detailed description and embodiments of the present disclosure. Also, it will be readily understood that the objects and advantages of the present disclosure are realized by the means and combinations thereof set forth in the appended claims.

Additional aspects will be set forth in part in the description which follows and, in part, will be apparent from the description, or may be learned by practice of the presented embodiments of the disclosure.

According to an aspect of an embodiment, a pixel driving circuit includes: a memory unit storing data based on a first signal and a second signal; a driver connected to a luminous element and supplying electric power to the luminous element based on the data stored in the memory unit; and a test controller controlling entry into a test mode in which it is tested whether the pixel driving circuit is defective, wherein the test controller generates a test mode activation signal based on the first signal and the second signal.

According to an aspect of another embodiment, a display apparatus includes: a display panel including an arrangement of a plurality of pixel driving circuits forming rows and columns; a scan driving circuit outputting a first signal sequentially to the pixel driving circuits arranged in a row direction, from among the plurality of pixel driving circuits included in the display panel; and a data driving circuit outputting to the pixel driving circuits arranged in a column direction, from among the plurality of pixel driving circuits included in the display panel, a second signal related to a driving of the luminous elements corresponding respectively to the plurality of pixel driving circuits, wherein each of the plurality of pixel driving circuits is according to the above aspect.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
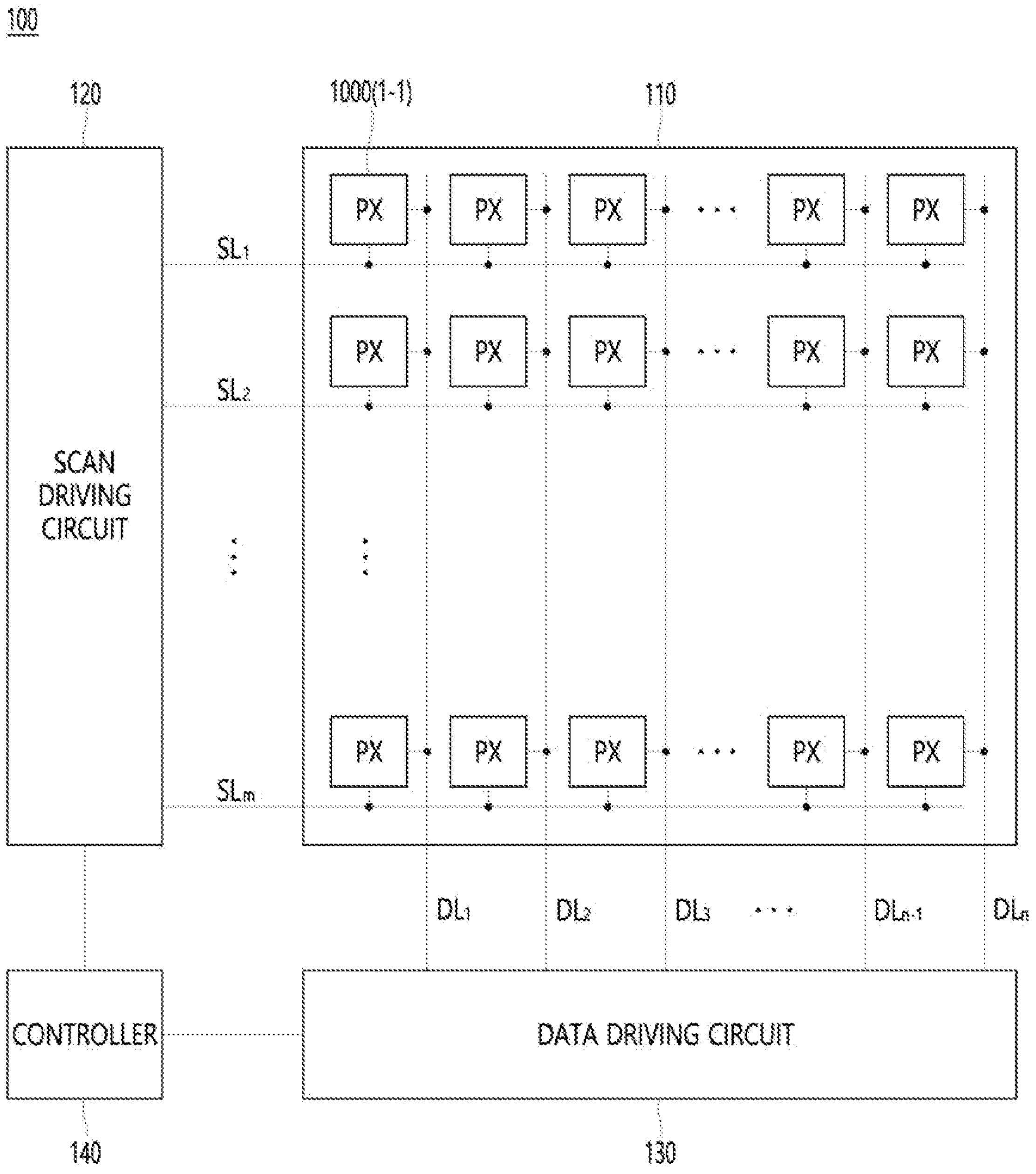
FIG. 1 is a diagram showing a display apparatus including a plurality of pixel driving circuits according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The attached drawings illustrate one or more embodiments and are referred to in order to gain a sufficient understanding, the merits thereof, and the objectives accomplished by the implementation. However, this is not intended to limit the present disclosure to particular modes of practice, and it is to be appreciated that all changes, equivalents, and substitutes that do not depart from the spirit and technical scope are encompassed in the present disclosure. The embodiments suggested herein are for rendering the description of the present disclosure complete and are set forth to provide a complete understanding of the scope of the disclosure to one of ordinary skill in the art to which the present disclosure pertains. In the description, certain detailed explanations of the related art are omitted when it is deemed that they may unnecessarily obscure the essence of the present disclosure.

With respect to the terms used in embodiments of the disclosure, general terms currently and widely used are selected in view of function with respect to the disclosure. However, the terms may vary according to an intention of a technician practicing in the pertinent art, an advent of new technology, etc. In specific cases, terms may be chosen arbitrarily, and in this case, definitions thereof will be described in the description of the corresponding disclosure. Accordingly, the terms used in the description should not necessarily be construed as simple names of the terms, but be defined based on meanings of the terms and overall contents of the present disclosure.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In description of the disclosure, the terms "first" and "second" may be used to describe various components, but the components are not limited by the terms. The terms may be used to distinguish one component from another component.

In embodiments hereinafter, "ON" used in association with an element state denotes an activated state of the element and "OFF" may denote an inactivated state of the element. "ON" used in association with a signal received by the element may denote a signal for activating the element and "OFF" may denote a signal for inactivating the element. An element may be activated by a high voltage or a low voltage. For example, a P-type transistor may be activated by a low voltage. An N-type transistor is activated by a high voltage. Therefore, it has to be understood that "ON" voltages with respect to the P-type transistor and the N-type transistor denote opposite (low vs. high) voltage levels.

When an element is "connected to" another element, this may include the cases in which the element is directly connected to another element and another element may intervene therebetween. Hereinafter, one or more embodiments will be described in detail with reference to accompanying drawings.

FIG. 1 is a diagram showing a display apparatus including a plurality of pixel driving circuits according to an embodiment of the present disclosure.

Referring to FIG. 1, a display apparatus 100 according to an embodiment of the present disclosure may include a display panel 110, a scan driving circuit 120, a data driving circuit 130, and a controller 140.

In the disclosure, the display panel 110 may include a plurality of pixels PX. In an embodiment, the plurality of pixels PX may include M×N (M and N are natural numbers) pixels arranged in a matrix, but the plurality of pixels PX may be arranged in various patterns, e.g., zig-zags, according to embodiments.

In the disclosure, the display panel 110 may be implemented as one of a liquid crystal display (LCD), light-emitting diode (LED) display, organic LED (OLED) display, active-matrix OLED (AMOLED) display, electrochromic display (ECD), digital mirror device (DMD), actuated mirror device (AMD), Grating Light Valve (GLV), Plasma Display Panel (PDP), Electro Luminescent Display (ELD), and vacuum fluorescent display (VFD), and may be implemented as any other type of flat panel display or flexible display. In the disclosure, an example in which the display panel 110 is implemented as an LED display is described below.

In the disclosure, each of the plurality of pixels PX may include one or more luminous elements. In an embodiment, the luminous element may be an LED. The LED may include a micro-LED having a size of 80 μm or less. In an embodiment, one pixel PX may output various colors through a plurality of luminous elements having different colors. In an example, one pixel PX may include luminous elements of red, green, and blue colors. In another example, one pixel PX may further include a white luminous element, and the white luminous element may substitute for one of the red, green, and blue luminous elements. In another example, one pixel PX may include one white luminous element. In an embodiment in which one pixel PX includes a plurality of luminous elements, each luminous element included in one pixel PX may be referred to as a sub-pixel.

In the disclosure, each pixel PX may include a pixel driving circuit for driving the luminous element, that is, sub-pixel, included in the pixel. In the disclosure, the pixel driving circuit may drive a turn-on or turn-off operation of the sub-pixel according to a signal output from the scan driving circuit 120 and/or the data driving circuit 130. In an embodiment, the pixel driving circuit may include at least one thin film transistor, at least one capacitor, etc. In an embodiment, the pixel driving circuit may be implemented via a stack structure on a semiconductor wafer.

In the disclosure, the display panel 110 may include one or more scan lines $SL_1$ to $SL_m$ arranged in a row direction and one or more data lines $DL_1$ to $DL_n$ arranged in a column direction. In the disclosure, the pixel PX may be located at each of cross points between one or more scan lines $SL_1$ to $SL_m$ and one or more data lines $DL_1$ to $DL_n$. Each pixel PX may be connected to one scan line $SL_k$ and one data line $DL_k$. One or more scan lines $SL_1$ to $SL_m$ may be connected to the scan driving circuit 120 and one or more data lines $DL_1$ to $DL_n$ may be connected to the data driving circuit 130.

In the disclosure, the scan driving circuit 120 may output a signal configured to drive one or more pixels connected to one of the one or more scan lines $SL_1$ to $SL_m$ (hereinafter, row signal). For example, the scan driving circuit 120 may sequentially select the one or more scan lines $SL_1$ to $SL_m$. For example, a pixel connected to a first scan line $SL_1$ may be driven during a first scan driving period and a pixel connected to a second scan line $SL_2$ may be driven during a second scan driving period. That is, the row signal may correspond to a clock signal for controlling driving of the luminous element.

In the disclosure, the data driving circuit 130 may output a signal related to gradation (hereinafter, column signal) to each pixel via one or more data lines $DL_1$ to $DL_n$. That is, the column signal may correspond to a bit value of image data. One data line is connected to one or more pixels in a longitudinal direction, but the signal related to the gradation may be input only to pixels connected to the scan line selected by the scan driving circuit 120.

In the disclosure, the controller 140 may output a control signal for executing operations of the scan driving circuit 120 and the data driving circuit 130. The controller 140 may output a control signal corresponding to image data corresponding to one image frame to the scan driving circuit 120 or the data driving circuit 130.

Figure 2:
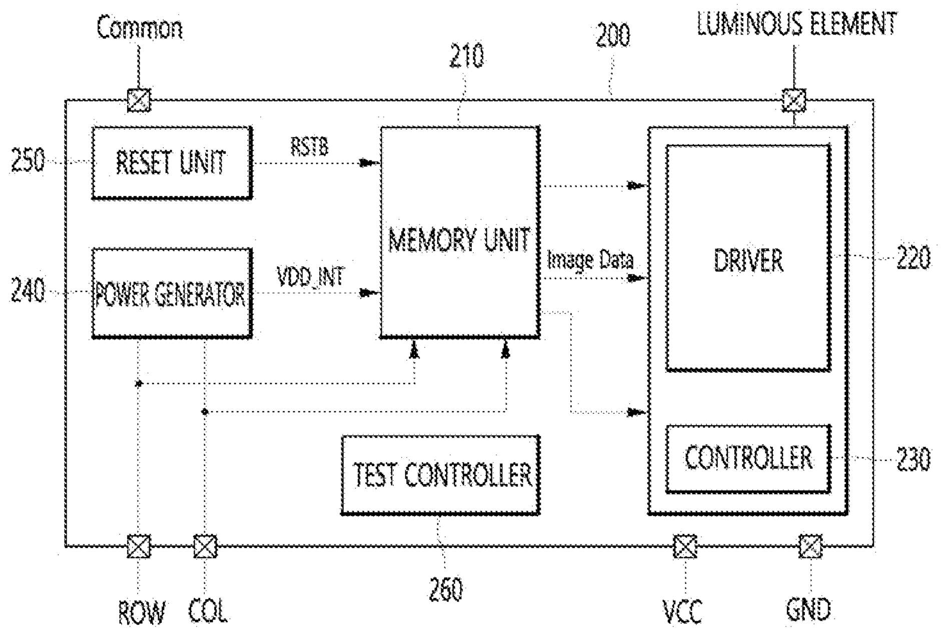
FIG. 2 is a block diagram schematically showing a configuration of a pixel driving circuit according to an embodiment of the present disclosure.

FIG. 2 is a block diagram schematically showing a configuration of a pixel driving circuit according to an embodiment of the present disclosure.

Referring to FIG. 2, a pixel driving circuit 200 according to an embodiment of the present disclosure may include a memory unit 210 and a driver 220. Also, the pixel driving circuit 200 may include terminals VCC and GND for being supplied with electric power, terminals for outputting an emission control signal to the luminous element, a terminal ROW for receiving an input of a row signal output from the scan driving circuit, and a terminal COL for receiving an input of a column signal output from the data driving circuit. Electrical connections may be configured so that the power and signals may be input/output via the above terminals.

In the disclosure, the memory unit 210 may store data regarding the driving of the luminous element. In an embodiment, the memory unit 210 may include a pixel-embedded memory and a register. The pixel-embedded memory 211 may store data related to the driving of the luminous element (e.g., LED), that is, video data. The video data includes data about the gradation of light emitted from the luminous element during one frame or one pulse width modulation (PWM) cycle. In an embodiment, the pixel-embedded memory 211 may store data regarding the charging of a capacitor (not shown) that may be included in the driver 220.

In the disclosure, the driver 220 may supply the power to the luminous element, based on the data stored in the memory unit 210. In detail, the driver 220 may supply the power to the luminous element, based on the data stored in the pixel-embedded memory 211. In an embodiment, the driver 220 may be configured to control the power supply to the luminous element according to a PWM driving method, and the PWM driving method is well known to those who skilled in the art, and thus, descriptions thereof are omitted.

In an embodiment, a bias portion may supply a bias power to the driver 220. For the bias power supply, the bias portion may be connected to the terminal VCC for being supplied with the electric power.

The pixel driving circuit 200 of the disclosure may further include a power generator 240. The power generator 240 may output a reference voltage VDD to the memory unit 210 by using the row signal output from the scan driving circuit and the column signal output from the data driving circuit. A configuration and operations of the power generator 240 are described later.

The pixel driving circuit 200 in the disclosure may include a reset portion 250 for controlling initialization of the data stored in the memory unit 210. In detail, the reset portion 250 may generate and output a reset signal RSTB to the memory unit 210. A configuration and operations of the reset portion 250 are described later.

The operation of the pixel driving circuit 200 of the disclosure described above is about the operation in a driving mode, and the pixel driving circuit 200 and components included in the pixel driving circuit 200 may differently operate in a test mode.

In detail, the pixel driving circuit 200 of the disclosure may further include a test controller 260. The test controller 260 may generate a test mode activation signal. The test mode activation signal may denote a signal configured to operate the pixel driving circuit 200 in the test mode, not in the driving mode. That is, based on the generated test mode activation signal, the pixel driving circuit 200 may enter the test mode, and the components included in the pixel driving circuit 200 may differently operate from the driving mode, in order to test whether the luminous element or the pixel driving circuit 200 normally operates.

In detail, the driver 220 may include a test driver (not shown) and a tester (not shown). In an embodiment, in the test mode, the driver 220 may apply a test signal to the luminous element according to the control from the controller 230. When the test signal is applied to the luminous element, it may be tested whether the luminous element or the pixel driving circuit normally operates.

In an embodiment, in the test mode, the power generator 240 may generate a test mode voltage and apply the test mode voltage to the tester according to the control from the controller 230. The test mode voltage may denote a power voltage for applying a lower voltage as compared with the reference voltage VDD mentioned above.

In an embodiment, in the test mode, the tester may measure a current that flows via the luminous element or the pixel driving circuit by using the test mode voltage. The tester may include a current measurement circuit for measuring the current. The tester may determine that, when a difference between the measured current value and a reference current value is equal to or greater than a threshold value, the luminous element or the pixel driving circuit is defective.

Figure 3:
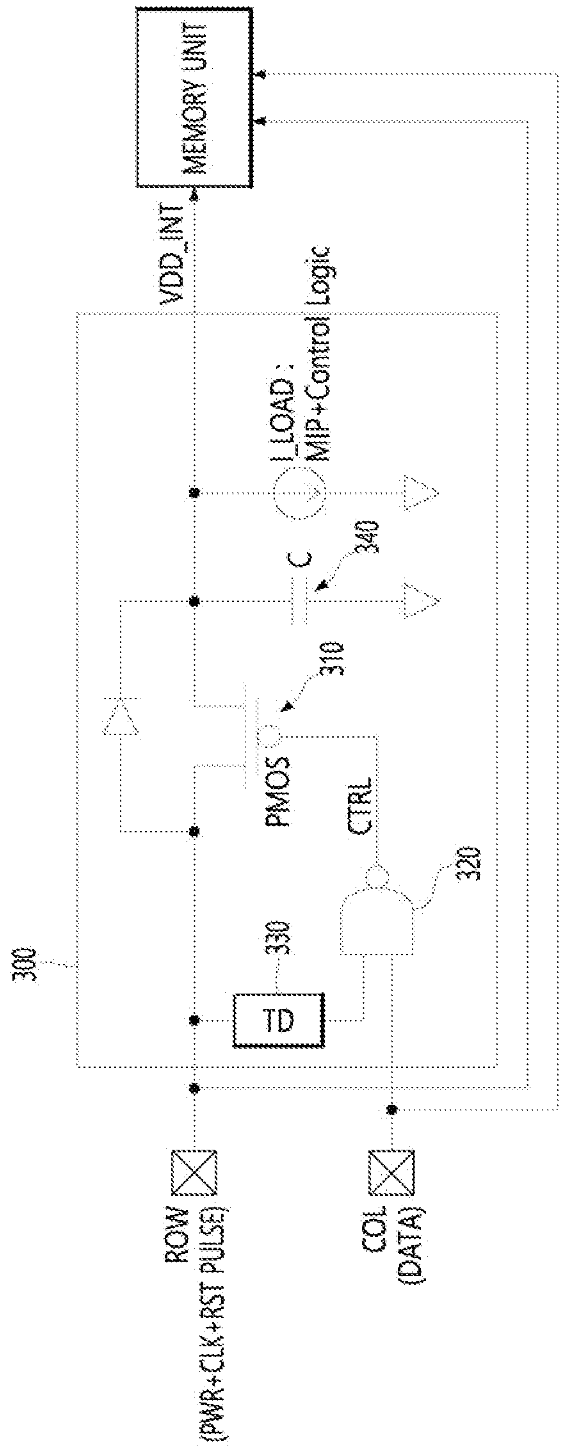
FIG. 3 is a circuit diagram of a power generator according to an embodiment of the present disclosure.

FIG. 3 is a circuit diagram of a power generator according to an embodiment of the present disclosure.

As described above, a pixel driving circuit according to an embodiment of the present disclosure may include a power generator. The power generator may output a reference voltage to a memory by using a row signal output from the scan driving circuit and a column signal output from the data driving circuit. Hereinafter, the 'memory' may denote a memory unit or a pixel-embedded memory.

Referring to FIG. 3, a power generator 300 according to an embodiment of the present disclosure may include a transistor 310, a NAND gate 320, and a time-delay element 330. The power generator 300 may be connected to an input terminal ROW of the row signal and an input terminal COL of the column signal and may receive the row signal and the column signal. Also, the power generator 300 may be provided with a reference voltage output terminal through which a reference voltage VDD_INT is output to the memory.

The transistor 310 may be disposed between the input terminal of the row signal and the output terminal of the reference voltage. According to an embodiment, the transistor 310 may include a PMOSFET. A drain terminal and a source terminal of the PMOSFET are connected to the input terminal of the row signal and the output terminal of the reference voltage, and a gate terminal of the PMOSFET may be connected to a signal output terminal of a NAND gate. For the reference, PMOSFET is turned off when the signal input to the gate terminal is in a logic-high ('1') and turned on when the signal input to the gate terminal is in a logic low ('0').

The NAND gate 320 may be disposed between an intermediate terminal (gate terminal) of the transistor 310 and the input terminal of the column signal. The NAND gate 320 is a logic circuit element and may have two input terminals and one output terminal. The column signal is input to one of the two input terminals of the NAND gate 320 and a delayed row signal may be input to the other of the two input terminals. The NAND gate 320 outputs the logic low only when the inputs are both in logic high ([1,1]) and otherwise ([0,0], [1,0], and [0,1]), the NAND gate 320 outputs the logic high.

The time-delay element 330 may be disposed between the input terminal of the row signal and the NAND gate. The time-delay element 330 may receive the input of row signal and delay the row signal by a preset amount of time, and may output the delayed row signal to one of the input terminals of the NAND gate 320. For example, the delayed time may be about 0.5 ns to about 1 ns.

Figure 4A:
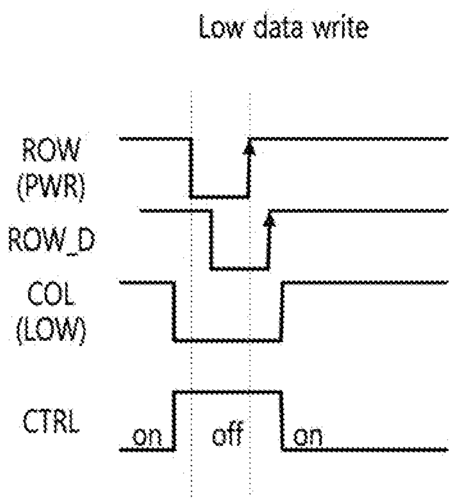
FIG. 4(*a*), FIG. 4(*b*), and FIG. 4(*c*) are a timing diagram illustrating that a power generator, according to an embodiment, outputs a reference voltage by using a row signal and a column signal.
Figure 4B:
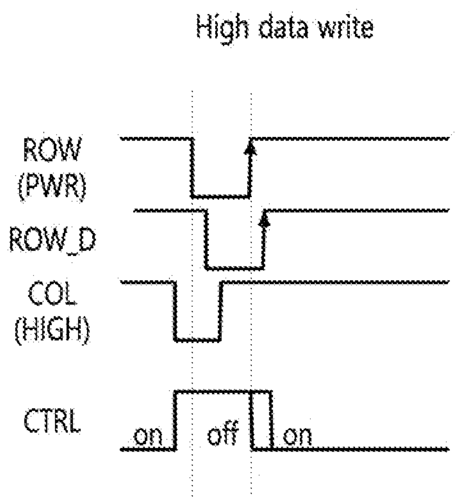
Figure 4C:
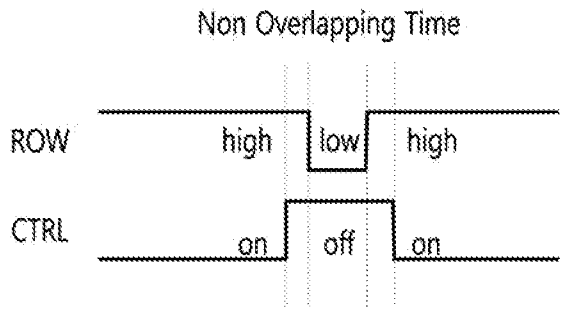

FIG. 4(*a*), FIG. 4(*b*), and FIG. 4(*c*) are a timing diagram illustrating that a power generator, according to an embodiment, outputs a reference voltage by using a row signal and a column signal.

Referring to FIG. 4(*a*), FIG. 4(*b*), and FIG. 4(*c*), 'ROW' denotes a row signal input through the input terminal of the row signal, 'ROW_D' denotes a delayed row signal after passing through the time-delay element (e.g., the time-delay element 330 of FIG. 3), 'COL' denotes a column signal input through the input terminal of the column signal, and 'CTRL' denotes a signal output from the NAND gate (e.g., NAND gate 320 of FIG. 3).

The row signal changes from the logic high into the logic low, and maintains at the logic low for a preset period of time and changes into the logic high. The column signal changes from the logic high into the logic low, and maintains at the logic low for a preset period of time and changes into the logic high. In some embodiments, the column signal may change from the logic high into the logic low slightly before the row signal changes into the logic low. Also, there may be a difference between durations of maintaining the logic low state when the data to be input to the memory is in the logic low and the logic high. When the data corresponds to the logic low, the column signal may change from the logic low to the logic high after the row signal changes to the logic high (see FIG. 4(*a*)). When the data corresponds to the logic high, the column signal may change from the logic low to the logic high before the row signal changes to the logic high (see FIG. 4(*b*)).

The NAND gate may be changed from the logic low to the logic high, and then to the logic log according to the timings of the delayed row signal and the column signal. As described above, a transistor (e.g., the transistor 310 of FIG. 3 (PMOSFET)) is turned on due to the logic low signal and turned off due to the logic high signal, and then, may be turned on again due to the logic low signal.

Referring to FIG. 4(*c*), when the row signal ROW is in the logic high, the transistor is in a turned-on state, and thus, a reference voltage VDD_INT may be output to the output terminal of the reference voltage. On the contrary, when the row signal ROW is in the logic low, the transistor is in a turned-off state, the reference voltage VDD_INT at the output terminal of the reference voltage may be maintained. To this end, the power generator (e.g., the power generator 300 of FIG. 3) may further include a capacitor (e.g., the capacitor 340 of FIG. 3) disposed between the output terminal of the reference voltage and a circuit ground. The capacitor may maintain the reference voltage VDD_INT at the output terminal of the reference voltage because the transistor is in the turned-off state.

Figure 5:
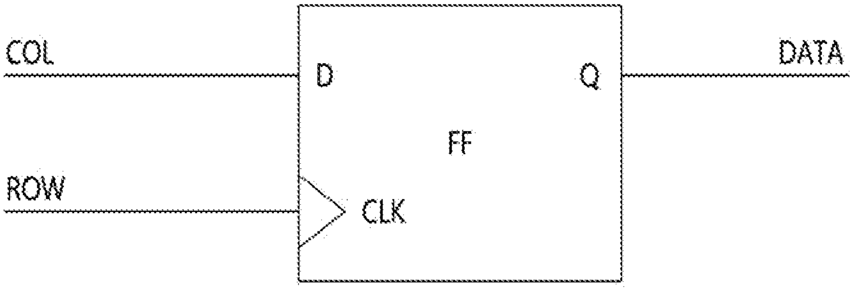
FIG. 5 is a block diagram schematically showing a configuration of a flipflop that may be included in a register or a pixel-embedded memory storing input data.

FIG. 5 is a block diagram schematically showing a configuration of a flipflop that may be included in a register or a pixel-embedded memory storing input data.

Referring to FIG. 5, the column signal is input to a data signal input terminal D of a flipflop FF, and the row signal may be input to a clock signal input terminal CLK. Referring to FIG. 4(*a*), when the column signal is in the logic low at the moment when the row signal changes from the logic low to the logic high (rising edge), the logic low data may be input to the flipflop FF. Also, referring to FIG. 4(*b*), when the column signal is in the logic high at the moment when the row signal changes from the logic low to the logic high, the logic high data may be input to the flipflop FF. That is, in the disclosure, the power generator outputs the reference power via the timings of the row signal and the column signal, and at the same time, the capacitor data or the video data may be input by using the same signals. In the disclosure, an example in which the memory includes a plurality of flipflops, but the disclosure is not limited thereto.

Hereinafter, a test controller which enables the pixel driving circuit to enter the test mode by using generally used signals, according to various embodiments, is described below.

The test controller according to various embodiments may be operated based on a signal that is generally used to store data in a memory. In detail, for example, when a row signal between the row signal and the column signal is used as a clock signal for storing the data in the memory unit, the test controller may control whether to enter the test mode by using the column signal as a clock signal.

Figure 6:
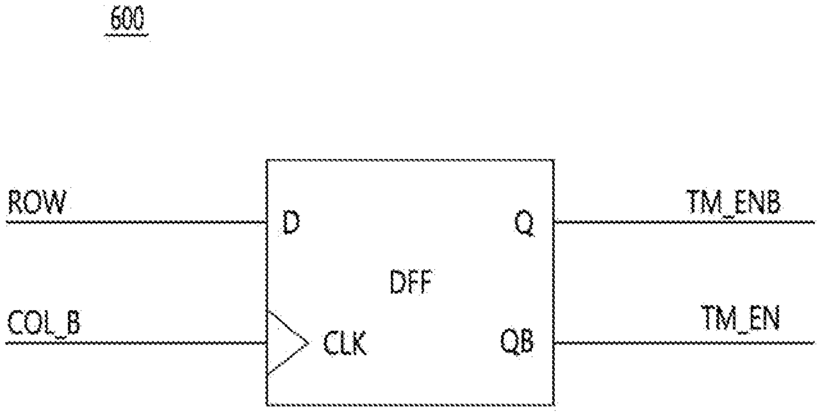
FIG. 6 is a diagram showing a configuration of a test controller according to an embodiment of the present disclosure.

FIG. 6 is a diagram showing a configuration of a test controller according to an embodiment of the present disclosure.

Referring to FIG. 6, a test controller 600 according to an embodiment may include a D flipflop. The test controller 600 may include a data signal input terminal D, a clock signal input terminal CLK, a signal output terminal Q, and an inversion signal output terminal QB. In an embodiment, a row signal may be input to the data signal input terminal, and the row signal may correspond to a clock signal, as described above, for controlling the driving of the luminous element and for storing data in the memory unit. In an embodiment, a column signal may be input to the clock signal input terminal, and the column signal may correspond to a data signal, as described above, related to a gradation of the luminous element stored in the memory unit and may correspond to a bit value of the image data. In an embodiment, a test mode activation signal TM_EN may be output from the inversion signal output terminal.

Figure 7:
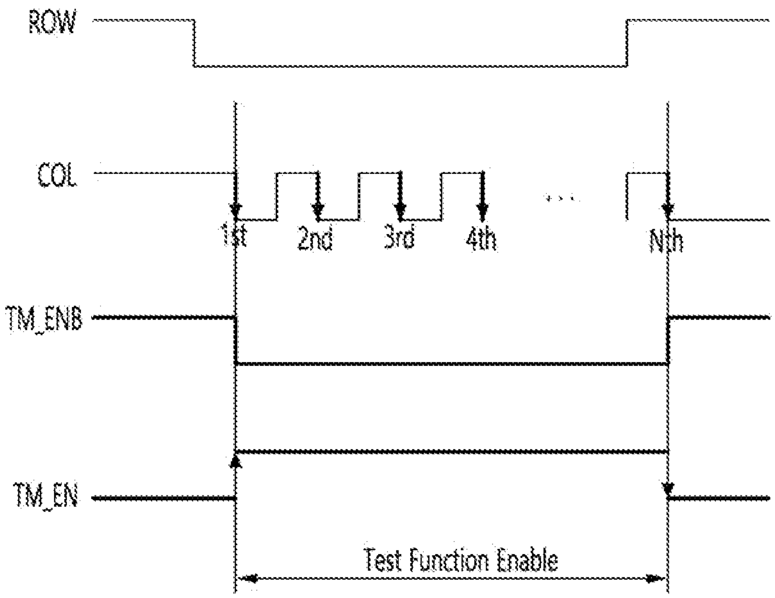
FIG. 7 is a timing diagram for describing operations of a test controller according to an embodiment of the present disclosure.

FIG. 7 is a timing diagram for describing operations of a test controller according to an embodiment of the present disclosure.

The timing diagram of FIG. 7 is related to a signal generated according to the operation of the test controller 600 shown in FIG. 6.

In FIG. 7, in order to enter the test mode, the scan driving circuit may output a row signal ROW maintaining at a logic low for a longer period of time than a reference interval. For entering the test mode, the data driving circuit may output a column signal that changes from the logic high to the logic low while the row signal is in the logic low.

In the embodiment, while the row signal is maintained at the logic low, the test mode activation signal TM_EN may change to the logic high at an edge of the column signal changing from the logic high to the logic low (hereinafter, falling edge). In addition, after the row signal changes to the logic high, the test mode activation signal TM_EN may change to the logic low at the falling edge of the column signal.

In the disclosure, the test mode activation signal TM_EN may allow the pixel driving circuit to enter the test mode during the logic high ('1').

Figure 8:
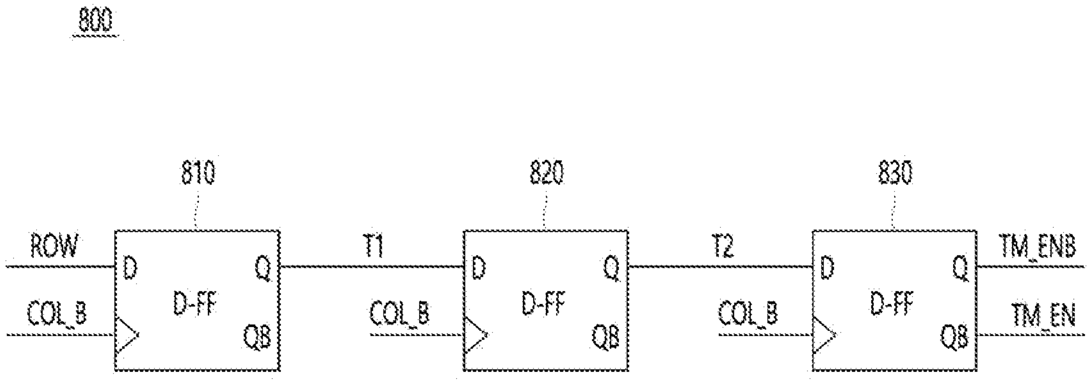
FIG. 8 is a diagram showing a configuration of a test controller according to another embodiment of the present disclosure.

FIG. 8 is a diagram showing a configuration of a test controller according to another embodiment of the present disclosure.

Referring to FIG. 8, a test controller 800 according to another embodiment may include a plurality of D flipflops. The example shown in FIG. 8 includes three D flipflops, but the test controller 800 may include an arbitrary number of D flipflops.

In the embodiment, a row signal may be input to a data signal input terminal of a first D flipflop 810, and a column signal may be input to a clock signal input terminal of the first D flipflop 810. As described above, the row signal may correspond to the clock signal for storing the data in the memory unit, and the column signal may correspond to a data signal related to a gradation of a luminous element stored in the memory unit.

In the embodiment, a first temporary signal T1 may be output from a signal output terminal of the first D flipflop 810.

In the embodiment, the first temporary signal T1 output from the signal output terminal of the first D flipflop 810 may be input to a data signal input terminal of a second D flipflop 820. A column signal may be input to a clock signal input terminal of the second D flipflop 820.

In the embodiment, a second temporary signal T2 may be output from a signal output terminal of the second D flipflop 820.

In the embodiment, the second temporary signal T2 output from the signal output terminal of the second D flipflop 820 may be input to a data signal input terminal of a third D flipflop 830. A column signal may be input to a clock signal input terminal of the third D flipflop 830.

In the embodiment, the test mode activation signal TM_EN may be output from an inversion signal output terminal of the third D flipflop 830. The test mode activation signal TM_EN may be a signal controlling whether the pixel driving circuit enters the test mode.

According to the test controller 800 of the embodiment, it may be controlled whether the pixel driving circuit enters the test mode by using the signals generally used in the pixel driving circuit, that is, the row signal and column signal.

Figure 9:
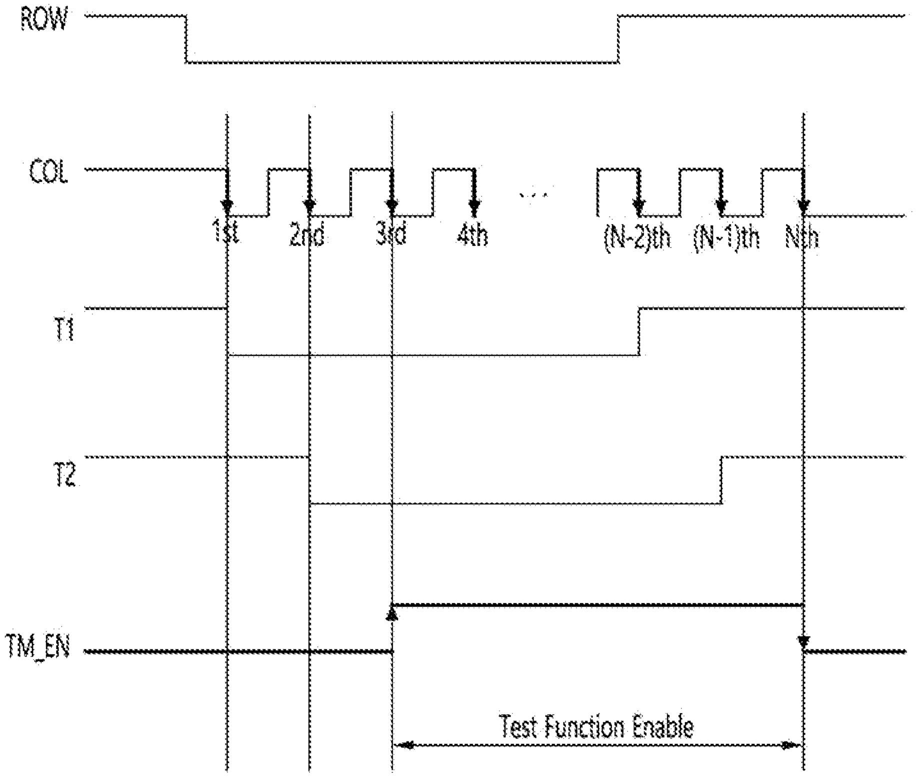
FIG. 9 is a timing diagram for describing operations of a test controller according to another embodiment of the present disclosure.

FIG. 9 is a timing diagram for describing operations of a test controller according to another embodiment of the present disclosure.

The timing diagram of FIG. 9 is related to a signal generated according to the operation of the test controller 800 shown in FIG. 8.

In FIG. 9, the first temporary signal T1 may correspond to the first temporary signal T1 that is an output from the first D flipflop 810 of FIG. 8, the second temporary signal T2 may correspond to the second temporary signal T2 that is an output from the second D flipflop 820 of FIG. 8, and the test mode activation signal TM_EN may correspond to the test mode activation signal TM_EN that is an output from the third D flipflop signal 830 of FIG. 8.

The test controller according to the embodiment may generate the test mode activation signal TM_EN by using the falling edge of the column signal as a clock signal.

In detail, in the embodiment, in order to enter the test mode, the scan driving circuit may output a row signal ROW maintaining at a logic low for a longer period of time than a reference interval. When the row signal ROW is in the logic low, the first temporary signal T1 may change to the logic low at a first falling edge (1st) of the column signal COL.

In response to the change of the first temporary signal T1 to the logic low, the second temporary signal T2 may change to the logic low at a second falling edge (2nd) that is the falling edge next to the first falling edge (1st) of the column signal COL.

In response to the change of the second temporary signal T2 to the logic low, the test mode activation signal TM_EN may change to the logic high at a third falling edge (3rd) that is the falling edge next to the second falling edge (2nd) of the column signal COL. That is, the test mode activation signal TM_EN may change to the logic high after two falling edges since the change of the row signal ROW to the logic low is applied to the first temporary signal T1, and this may be a result from the configuration of the test controller 800 of FIG. 8.

In addition, in the embodiment, the row signal ROW may change from the logic low to the logic high after a certain period of time. When the row signal ROW is in the logic high, the first temporary signal T1 may change to the logic high at an (N−2)th falling edge ((N−2)th) of the column signal COL.

In response to the change of the first temporary signal T1 to the logic high, the second temporary signal T2 may change to the logic high at an (N−1)th falling edge ((N−1)th) that is the falling edge next to the (N−2)th falling edge ((N−2)th) of the column signal COL.

In response to the change of the second temporary signal T2 to the logic high, the test mode activation signal TM_EN may change to the logic low at an N-th falling edge (N-th) that is the falling edge next to the (N−1)th falling edge ((N−1)th) of the column signal COL.

In the disclosure, the pixel driving circuit may enter the test mode when the test mode activation signal TM_EN is in the logic high. In other words, the pixel driving circuit may enter the test mode in a test function enable section in which the test mode activation signal TM_EN is in the logic high.

According to the test controller of the embodiment, unintentional entry of the pixel driving circuit into the test mode due to the noise or glitch of the row signal or the column signal may be prevented.

Figure 10:
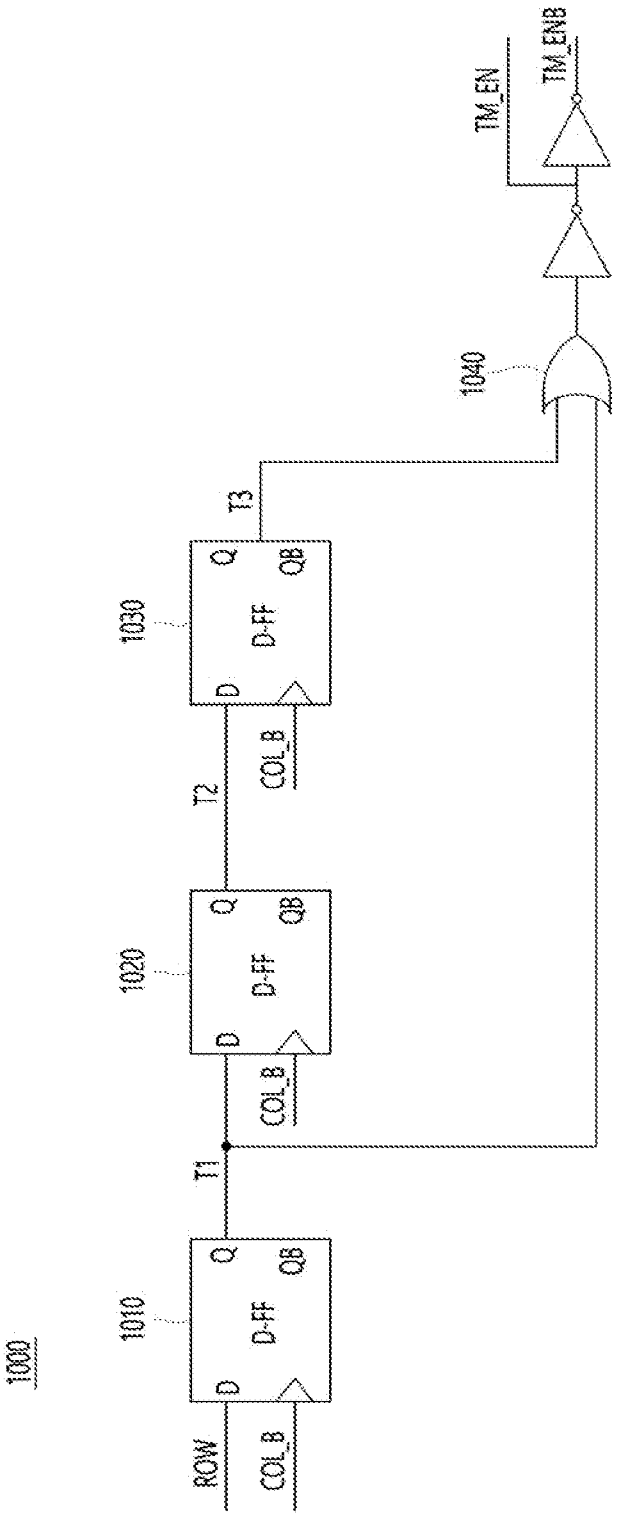
FIG. 10 is a diagram showing a configuration of a test controller according to another embodiment of the present disclosure.

FIG. 10 is a diagram showing a configuration of a test controller according to another embodiment of the present disclosure.

Referring to FIG. 10, a test controller 1000 according to another embodiment may include a plurality of D flipflops and logic elements. The example shown in FIG. 10 includes three D flipflops, but the test controller 1000 may include an arbitrary number of D flipflops.

In the embodiment, a row signal may be input to a data signal input terminal of a first D flipflop 1010, and a column signal may be input to a clock signal input terminal of the first D flipflop 1010. As described above, the row signal may correspond to the clock signal for storing the data in the memory unit, and the column signal may correspond to a data signal related to a gray level of a luminous element stored in the memory unit.

In the embodiment, a first temporary signal T1 may be output from a signal output terminal of the first D flipflop 1010.

In the embodiment, the first temporary signal T1 output from the signal output terminal of the first D flipflop 1010 may be input to a data signal input terminal of a second D flipflop 1020. A column signal may be input to a clock signal input terminal of the second D flipflop 1020.

In the embodiment, a second temporary signal T2 may be output from a signal output terminal of the second D flipflop 1020.

In the embodiment, the second temporary signal T2 output from the signal output terminal of the second D flipflop 1020 may be input to a data signal input terminal of a third D flipflop 1030. A column signal may be input to a clock signal input terminal of the third D flipflop 1030.

In the embodiment, the third temporary signal T3 may be output from the signal output terminal of the third D flipflop 1030.

In the embodiment, the first temporary signal T1 output from the first D flipflop 1010 and the third temporary signal T3 output from the signal output terminal of the third D flipflop 1030 may be input to an OR gate 1040.

The OR gate 1040 is a logic circuit element and may have two input terminals and one output terminal. When any one of the signals input to the two input terminals of the OR gate 1040 is in the logic high, the OR gate 1040 outputs a signal in the logic high to the output terminal. In other words, in the embodiment, when one of the first temporary signal T1 and the third temporary signal T3 is in the logic high, the OR gate 1040 may output the signal in the logic high to the output terminal. On the contrary, when both the first temporary signal T1 and the third temporary signal T3 are in logic low, the OR gate 1040 may output a signal in the logic low to the output terminal.

In the embodiment, an inverted test mode activation signal TM_ENB may be output from the output terminal of the OR gate 1040. An inverted signal of the inverted test mode activation signal TM_ENB by passing through a signal inverter may be the test mode activation signal TM_EN. The test mode activation signal TM_EN may be a signal controlling whether the pixel driving circuit enters the test mode.

According to the test controller 1000 of the embodiment, it may be controlled whether the pixel driving circuit enters the test mode by using the signals generally used in the pixel driving circuit, that is, the row signal and column signal.

Figure 11:
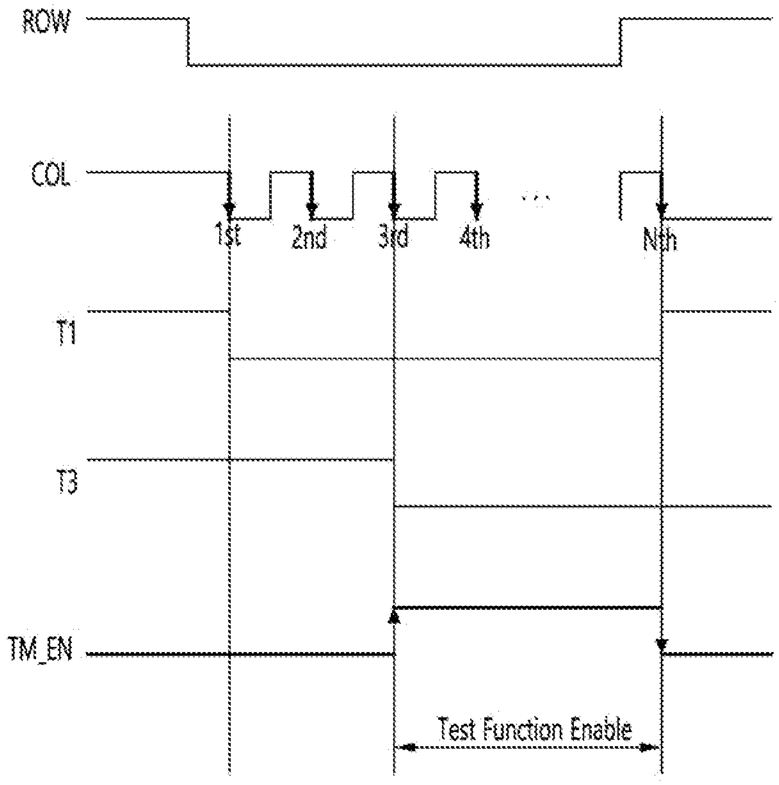
FIG. 11 is a timing diagram for describing operations of a test controller according to another embodiment of the present disclosure.

FIG. 11 is a timing diagram for describing operations of a test controller according to another embodiment of the present disclosure.

The timing diagram of FIG. 11 is related to a signal generated according to the operation of the test controller 1000 shown in FIG. 10.

In FIG. 11, the first temporary signal T1 may correspond to the first temporary signal T1 output from the first D flipflop 1010 of FIG. 10, the third temporary signal T3 may correspond to the third temporary signal T3 output from the third D flipflop 1030 of FIG. 10, and the test mode activation signal TM_EN may correspond to the test mode activation signal TM_EN that is an inverted signal of the inverted test mode activation signal TM_ENB that is output from the OR gate 1040 of the FIG. 10.

The test controller according to the embodiment may generate the test mode activation signal TM_EN by using the falling edge of the column signal as a clock signal.

In detail, in the embodiment, in order to enter the test mode, the scan driving circuit may output a row signal ROW maintaining at a logic low for a longer period of time than a reference interval. When the row signal ROW is in the logic low, the first temporary signal T1 may change to the logic low at a first falling edge (1st) of the column signal COL.

Although not shown in FIG. 11, in response to the change of the first temporary signal T1 to the logic low, the second temporary signal may change to the logic low at a second falling edge (2nd) that is the falling edge next to the first falling edge (1st) of the column signal COL.

In response to the change of the second temporary signal to the logic low, the third temporary signal T3 may change to the logic low at the third falling edge (3rd) that is the falling edge next to the second falling edge (2nd) of the column signal COL. That is, the third temporary signal T3 may change to the logic low after two falling edges since the change of the row signal ROW to the logic low is applied to the first temporary signal T1, and this may be a result from the configuration of the test controller 1000 of FIG. 10.

As described above with reference to FIG. 10, when the inverted test mode activation signal TM_ENB is an output from the OR gate, and accordingly, when an input to the OR gate, that is, any one of the first temporary signal T1 and the third temporary signal T3, is in the logic high, the inverted test mode activation signal TM_ENB is in the logic high. When both the first temporary signal T1 and the third temporary signal T3 are in the logic low, the inverted test mode activation signal TM_ENB is in the logic low.

Accordingly, the inverted test mode activation signal TM_ENB changes to the logic low in response to the change of the third temporary signal T3 into the logic low at the third falling edge of the column signal COL, because the first temporary signal T1 is also in the logic low. The test mode activation signal TM_EN changes to the logic high in response to the change of the third temporary signal T3 to the logic low at the third falling edge of the column signal COL, because the test mode activation signal TM_EN is an inverted signal of the inverted test mode activation signal TM_ENB.

In addition, in the embodiment, the row signal ROW may change from the logic low to the logic high after a certain period of time. When the row signal ROW is in the logic high, the first temporary signal T1 may change to the logic high at the Nth falling edge (Nth) of the column signal COL.

In some embodiments, in response to the change of the first temporary signal T1 to the logic high, the inverted test mode activation signal TM_ENB that is the output from the OR gate and the test mode activation signal TM_EN may also change. That is, at the Nth falling edge, the first temporary signal T1 that is one of the inputs to the OR gate changes to the logic high, the inverted test mode activation signal TM_ENB that is the output from the OR gate may change to the logic high, and accordingly, the test mode activation signal TM_EN may change to the logic low.

In the disclosure, the pixel driving circuit may enter the test mode in a test function enable section in which the test mode activation signal TM_EN is in the logic high.

According to the test controller of the embodiment, unintentional entry of the pixel driving circuit into the test mode due to the noise or glitch of the row signal or the column signal may be prevented.

Hereinafter, a test mode control method according to various embodiments based on the test controller described above is described below.

As described above, the test controller may generate a test mode activation signal. In an embodiment, the test mode activation signal may be input to the controller. The controller controls operations of components included in the pixel driving circuit, including a driver, and may correspond to the controller 230 described above with reference to FIG. 2.

In an embodiment, the driver may generate a test control signal based on the test mode activation signal received from the test controller. For example, the test control signal may change to the logic high in response to the test mode activation signal in the logic high, and may change to the logic low in response to the test mode activation signal in the logic low. Alternatively, for example, the test control signal may be generated only when the test mode activation signal is in the logic high.

Figure 12:
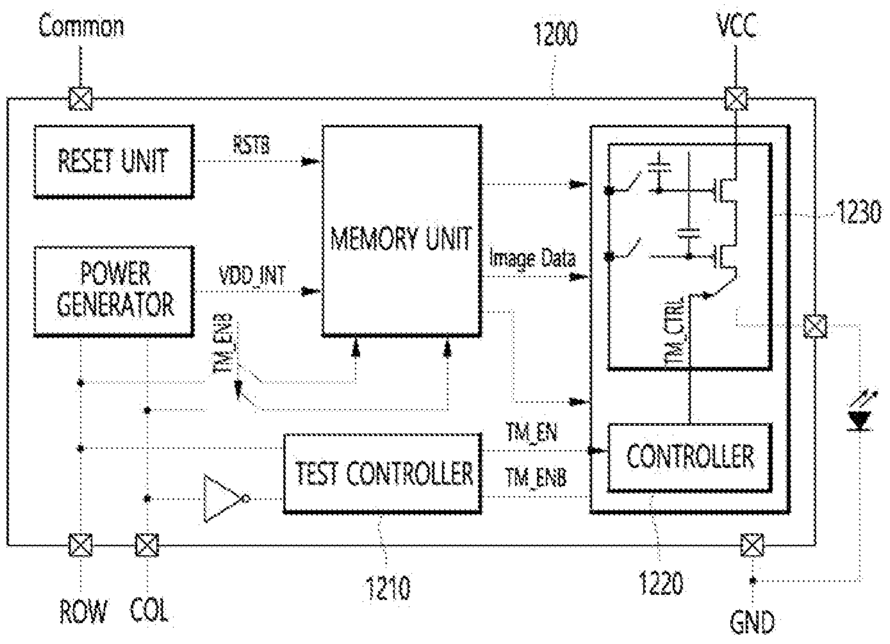
FIG. 12 is a block diagram for describing a test mode control method according to an embodiment of the present disclosure.

FIG. 12 is a block diagram for describing a test mode control method according to an embodiment of the present disclosure.

Referring to FIG. 12, a pixel driving circuit 1200 includes a test controller 1210, a controller 1220, and a driver 1230.

In an embodiment, the pixel driving circuit 1200 may be configured to test whether the pixel driving circuit including the driver, as well as the luminous element, is defective in the test mode.

In detail, the test controller 1210 may generate the test mode activation signal TM_EN based on the row signal ROW and the column signal COL, as described above.

In an embodiment, the pixel driving circuit may block the input of data to the memory unit, when the test mode activation signal TM_EN is in the logic high. In detail, the test mode activation signal TM_EN or the inverted test mode activation signal TM_ENB may block the input of the row signal ROW and the column signal COL to the memory unit. In FIG. 12, the inverted test mode activation signal TM_ENB blocks the input of the row signal ROW and the column signal COL to the memory unit, but may be appropriately configured so as not to affect the driving mode.

In an embodiment, the test mode activation signal TM_EN may be input to the controller 1220. In an embodiment, as described above, the controller 1220 may generate a test control signal TM_CTRL based on the test mode activation signal TM_EN received form the test controller 1210.

In an embodiment, the test control signal TM_CTRL may apply to the driver 1230 and change circuit connection of the driver 1230. For example, in response to the test mode activation signal TM_EN in the logic high, the test control signal TM_CTRL may change to the logic high, and when the test control signal TM_CTRL is in the logic high, the circuit connection of the driver 1230 may be changed for the test mode.

In an embodiment, as shown in FIG. 12, the test control signal TM_CTRL may activate an analog circuit including a bias portion (not shown), the driver 1230, etc. and the output terminal in the test mode, and accordingly, the pixel driving circuit may be configured so that verification about an integrated circuit, as well as whether the luminous element is normal, may be performed.

Figure 13:
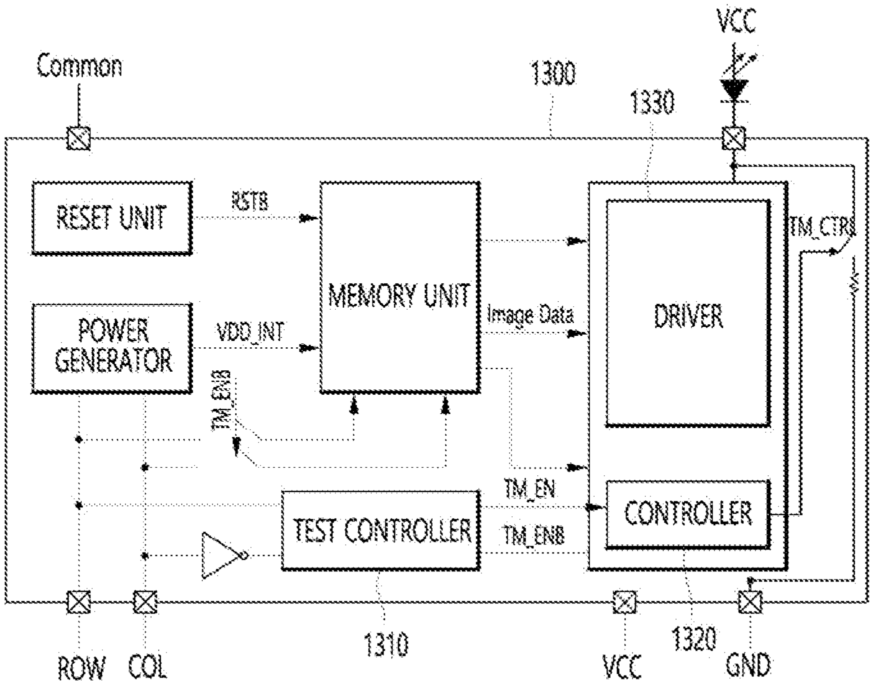
FIG. 13 is a block diagram for describing a test mode control method according to another embodiment of the present disclosure.

FIG. 13 is a block diagram for describing a test mode control method according to another embodiment of the present disclosure.

Referring to FIG. 13, a pixel driving circuit 1300 includes a test controller 1310, a controller 1320, and a driver 1330.

In an embodiment, the pixel driving circuit 1300 may be configured so that a defect of the luminous element is tested without a current flowing in the driver in the test mode.

In detail, the test controller 1310 may generate the test mode activation signal TM_EN based on the row signal ROW and the column signal COL, as described above.

In an embodiment, the pixel driving circuit may block the input of data to the memory unit, when the test mode activation signal TM_EN is in the logic high. In detail, the test mode activation signal TM_EN or the inverted test mode activation signal TM_ENB may block the input of the row signal ROW and the column signal COL to the memory unit. In FIG. 13, the inverted test mode activation signal TM_ENB blocks the input of the row signal ROW and the column signal COL to the memory unit, but may be appropriately configured so as not to affect the driving mode.

In an embodiment, the test mode activation signal TM_EN may be input to the controller 1320. In an embodiment, as described above, the controller 1320 may generate a test control signal TM_CTRL based on the test mode activation signal TM_EN received form the test controller 1310.

In an embodiment, the test control signal TM_CTRL may apply to an outer part of the driver 1330 and change circuit connection to the driver 1330. For example, in response to the test mode activation signal TM_EN in the logic high, the test control signal TM_CTRL may change to the logic high, and when the test control signal TM_CTRL is in the logic high, the circuit connection to the driver 1330 may be changed for the test mode.

In an embodiment, as shown in FIG. 13, the pixel driving circuit may be configured so that the test control signal TM_CTRL may activate only the output terminal and may cause a certain current to flow through an output resistance, and accordingly, whether the luminous element is normal may be only verified.

The scan driving circuit and the data driving circuit described above may each include a processor, an application-specific integrated circuit (ASIC), another chipset, a logic circuit, a register, a communication modem, a data processing apparatus, etc. known in the technical field to which the disclosure belongs, in order to execute various control logics described above. Also, when the control logic described above is implemented as software, the scan driving circuit and the data driving circuit may be each implemented as a set of program modules. In some embodiments, the program modules are stored in the memory device and may be executed by a processor.

For a computer to read a program and to execute a method implemented by the program, the program may include a code that is coded in a computer language, which a processor (e.g., a central processing unit (CPU)) of the computer may read through a device interface of the computer, such as C, C++, C #, JAVA, Python, or a machine language. This code may include a functional code related to a function or the like that defines functions required to execute the methods, and may include an execution procedure-related control code necessary for the processor of the computer to execute the functions in accordance with a predetermined procedure. Also, such a code may further include a memory reference related code as to which additional information or media required for the processor of the computer to execute the above-described functions should be referenced at any location (address) of the internal or external memory of the computer. In addition, when the processor of the computer needs to communicate with any other computer, server, etc., which are at remote locations, to perform the above-described functions, the code may further include a communication-related code as to how to communicate with which remote computer, server, etc., what information or media should be transmitted or received during communication, and the like.

The storage medium storing the program may denote the medium that does not store data for a short period of time such as a register, a cache memory, or the like but semi-permanently stores to be read by the device. Specifically, the storage medium may include, but is not limited to, a ROM, a RAM, a CD-ROM, a magnetic tape, a floppy disk, an optical data storage device, and the like. That is, the program may be stored in various recording media on various servers to which the computer may access, or in various recording media on the user's computer. The storage medium may also be distributed over network coupled computer systems so that the computer readable code is stored in a distributive manner.

It will be understood by one of ordinary skill in the art that various changes in form and details may be made therein without departing from the spirit and scope of the present disclosure as defined by the appended claims. Therefore, the spirit of the present disclosure shall not be limited to the above-described embodiments, and the entire scope of the appended claims and their equivalents will fall within the scope and spirit of the disclosure.

According to embodiments, the pixel driving circuit may be allowed to enter the test mode in which it may be tested whether the pixels are defective, by using an existing signal, not a new signal.

Also, the unintentional entry of the pixel driving circuit into the test mode may be prevented.

Also, the driving mode and the test mode may be clearly distinguished from each other, and the pixel driving circuit may be configured so that the operations according to the driving mode are not affected in the test mode.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A pixel driving circuit comprising:

a memory storing data based on a first signal and a second signal;

a driver connected to a luminous element and supplying electric power to the luminous element based on the data stored in the memory; and a test controller controlling entry into a test mode in which it is tested whether the pixel driving circuit is defective, wherein the test controller receives the first signal and the second signal and generates a test mode activation signal based on the first signal and the second signal, wherein the pixel driving circuit is included in each individual pixel and is configured to drive the individual pixel based on the first signal and the second signal.

2. The pixel driving circuit of claim 1, wherein the memory stores the data by using the first signal as a clock signal, and the test controller generates the test mode activation signal by using the second signal as a clock signal.

3. The pixel driving circuit of claim 2, wherein the test controller generates the test mode activation signal based on a falling edge of the second signal.

4. The pixel driving circuit of claim 2, wherein the test controller comprises a D flipflop having a data signal input terminal to which the first signal is input and a clock signal input terminal to which an inverted signal of the second signal is input.

5. The pixel driving circuit of claim 4, wherein the test controller comprises a plurality of D flipflops that are connected to one another in series, the inverted signal of the second signal is input to the clock signal input terminal in each of the plurality of D flipflops, the first signal is input to the data signal input terminal of a frontmost D flipflop from among the plurality of D flipflops, and an output from an adjacent D flipflop is input to the data signal input terminal of the D flipflop other than the frontmost D flipflop, from among the plurality of D flipflops.

6. The pixel driving circuit of claim 5, wherein the test controller further comprises an OR gate to which an output from the frontmost D flipflop from among the plurality of D flipflops and an output from a rearmost D flipflop from among the plurality of D flipflops are input.

7. The pixel driving circuit of claim 1, wherein, when the test mode activation signal is in a logic high, input of the data to the memory is blocked based on the first signal and the second signal.

8. The pixel driving circuit of claim 7, further comprising a controller controlling operations of the driver, wherein the controller generates a test control signal based on the test mode activation signal from the test controller.

9. The pixel driving circuit of claim 8, wherein, when the test control signal is in a logic high, it is tested whether the driver and the luminous element are defective.

10. The pixel driving circuit of claim 8, wherein, when the test control signal is in a logic high, a current does not flow in the driver and whether the luminous element is defective is tested.

11. A display apparatus comprising:

a display panel including an arrangement of a plurality of pixel driving circuits forming rows and columns;

a scan driving circuit outputting a first signal sequentially to the plurality of pixel driving circuits arranged in a row direction, from among the plurality of pixel driving circuits included in the display panel; and a data driving circuit outputting to the plurality of pixel driving circuits arranged in a column direction, from among the plurality of pixel driving circuits included in the display panel, a second signal related to a driving of luminous elements corresponding respectively to the plurality of pixel driving circuits, wherein each of the plurality of pixel driving circuits comprises:

a memory storing data based on the first signal and the second signal;

a driver connected to a luminous element and supplying electric power to the luminous element based on the data stored in the memory; and a test controller controlling entry into a test mode in which it is tested whether the pixel driving circuit is defective, wherein the test controller receives the first signal and the second signal and generates a test mode activation signal based on the first signal and the second signal wherein the pixel driving circuit is included in each individual pixel and is configured to drive the individual pixel according to the first signal and the second signal.

* * * * *